Dec. 8, 1970  B. K. REID ET AL  3,545,267
FLUID PRESSURE TRANSDUCER
Filed Oct. 22, 1968  2 Sheets-Sheet 1
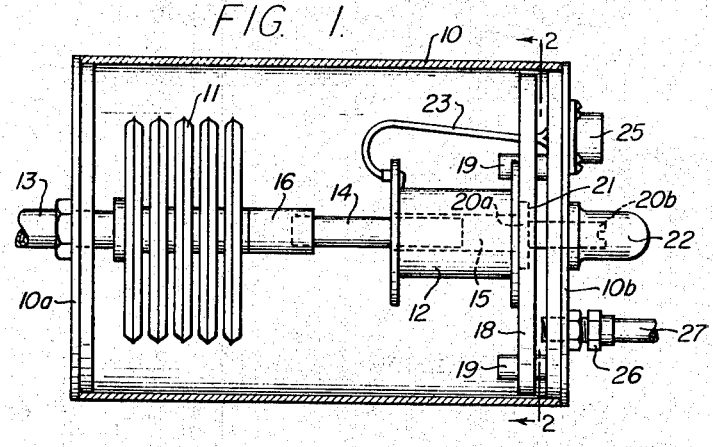
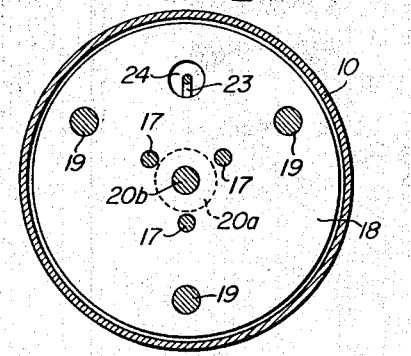
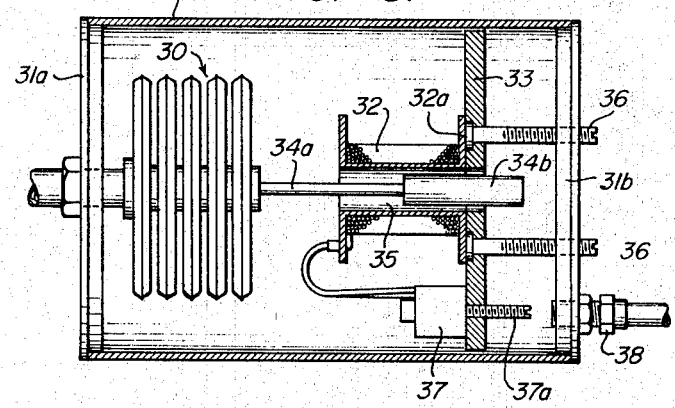
INVENTORS
BRUCE K. REID
FRANK W. CHRISTENSEN
BY
*Mallinckrodt and Mallinckrodt*
ATTORNEYS

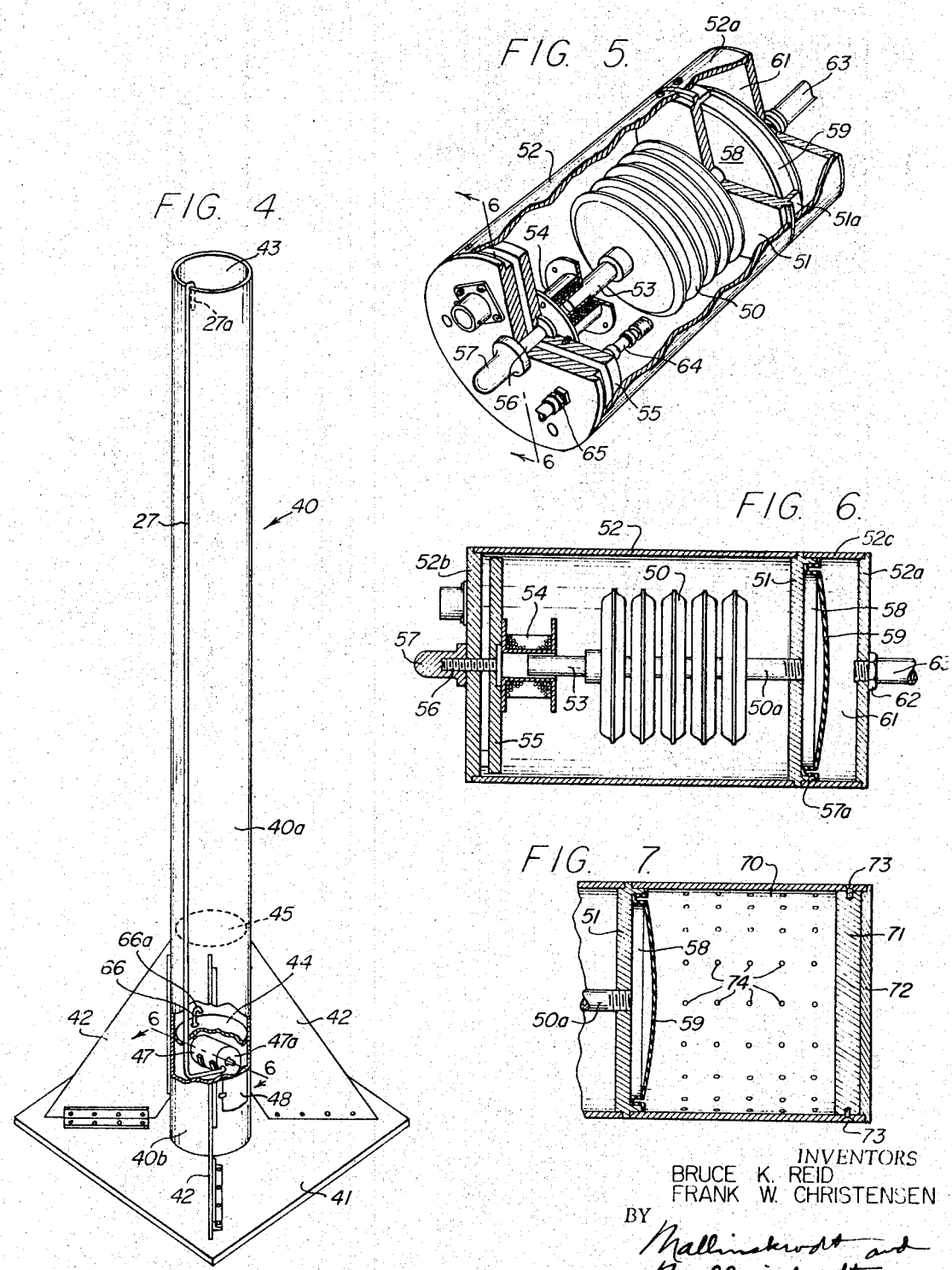

United States Patent Office 3,545,267
Patented Dec. 8, 1970

3,545,267
FLUID PRESSURE TRANSDUCER
Bruce K. Reid and Frank W. Christensen, Ogden, Utah, assignors to Thiokol Chemical Corporation, Bristol, Pa., a corporation of Delaware
Filed Oct. 22, 1968, Ser. No. 769,554
Int. Cl. G01w 1/14
U.S. Cl. 73—171                                17 Claims

ABSTRACT OF THE DISCLOSURE

A device for producing electrical output signals in response to fluid-pressure input. A bellows serves to receive a fluid under pressure and to expand in accordance with the pressure. The bellows is housed within a canister, being secured and supported at one of its ends and carrying a projecting magnetic core piece at its other end. This core piece projects from the bellows into an aligned hollow core of an electrical induction coil for friction-free movement relative to such coil; both bellows and core piece can be mounted as a cantilever. The coil is adapted to be encountered into an electrical output circuit, whose output varies in accordance with the value of inductance in the circuit. This depends upon the extent to which the core piece has been pushed into the coil, or, for a different coil-core piece relationship, the extent to which it has been pushed out of the coil, by reason of fluid pressure in the bellows. The coil is mounted on a movable bulkhead internally of the canister, the bulkhead being adjustable in position from outside the conister for pre-setting the electrical relationship from time to time as desired. Optional novel features are the pre-charging of the bellows and of an intercommunicating pressure-input chamber with an antifreeze liquid, and the provision of a variable inductance in series with the coil to enable optimization of the transducer scale factor.

RELATED APPLICATION

The present application is related to U.S. patent application Ser. No. 691,263, filed Dec. 18, 1967, by Duane G. Chadwick and entitled "Precipitation Measurement Gauge," now Pat. No. 3,487,684. That application discloses but does not claim an improved version of pressure transducer invented by the present applicants and claimed herein. Both applications are owned by a common assignee.

BACKGROUND OF THE INVENTION

Field

Broadly, the device is a transducer for producing electrical output signals in response to mechanical input. In particular, the device responds to fluid pressure and varies inductance in an electrical output circuit in accordance with variations in such fluid pressure.

State of the art

Pressure sensing or measuring apparatus for various purposes have been developed heretofore wherein pressure fluids are introduced into expansible bellows or into closed chambers provided with expansible diaphragms, and such bellows and diaphragms have been equipped with projecting core pieces that extend into electrical induction coils for changing the electrical outputs of circuits in which such coils are connected. Examples of these are found in U.S. Pat. Nos. 2,692,501; 3,068,700; and 3,161,059.

SUMMARY OF THE INVENTION

The pressure transducer of this invention is especially useful in connection with precipitation measurement gauges, such as that forming the subject matter of the related Chadwick application, Ser. No. 691,263, noted hereinbefore, and with other liquid-level gauges, e.g. for measuring variations in the level of rivers and other bodies of water. It constitutes an improvement on the pressure transducer illustrated in FIG. 5 of that Chadwick application, and can be mounted with its longitudinal axis horizontal, if desired, so that one or both ends are easily accessible from the side when installed. Moreover, it provides for pre-setting the positional, and thus the electrical, relationship between induction coil and core piece of the transducer from time to time as desired, which is particularly useful in the calibrating of the measurement gauge.

A bellows is mounted within a housing, advantageously a canister, for expansion longitudinally. It is supported at or near one end of the canister and carries a projecting core piece at its opposite end, both bellows and core piece can be arranged as a cantilever with respect to a therewith-aligned, electrical induction coil into which the coil piece projects for free movement therealong. The coil is mounted on a bulkhead that is positioned internally of and near the opposite end of the canister and that is adjustable toward and away from the bellows. An adjusting screw, operable exteriorly of the canister, serves to move a bulkhead for calibration purposes.

An optional novel feature is the provision of a pressure-input chamber in open communication with the interior of the bellows and sealed by a fully compliant diaphragm. Both the bellows and the chamber are completely filled with an antifreeze liquid, and the fluid pressure to be measured is exerted against the exterior face of the diaphragm. This precludes any possibility of unexpectedly heavy precipitation, accompanied by excessively cold weather, damaging operating parts of the transducer by freezing of the pressure liquid in a precipitation measurement gauge. Moreover, the transducer can be manufactured and sold as a completely prepared package ready for any and all uses.

Another optional feature is the provision of a variable inductance in series circuit with the induction coil to enable the scale factor of the transducer to be optimized under any given condition of use in a measurement system.

THE DRAWINGS

In the accompanying drawings, which illustrate constructions presently contemplated as the best mode of carrying out the invention:

FIG. 1 is a longitudinal axial section through the transducer canister, revealing internal parts in elevation;

FIG. 2, a transverse section taken on the line 2—2 of FIG. 1;

FIG. 3, a view corresponding to that of FIG. 1 but showing a somewhat different version of the transducer;

FIG. 4, an isometric view of a typical precipitation measurement gauge of the invention, with part of the precipitation-receiving vessel broken out for convenience of illustration and other portions broken away to show the bottom of the vessel and the pressure transducer;

FIG. 5, an enlarged isometric view of the pressure transducer, with portions of the canister wall broken away and some of the internal parts shown in section;

FIG. 6, an axial section of the pressure transducer taken on the line 6—6 of FIG. 4 and drawn to the larger scale of FIG. 5; and FIG. 7, a fragmentary view corresponding to the right-hand portion of FIG. 6, but showing a different construction for that portion of the transducer to adapt it for measuring the level of water in a river or other body of water.

DETAILED DESCRIPTION OF THE ILLUSTRATED EMBODIMENTS

In the form illustrated by FIGS. 1 and 2, the pressure transducer of the invention comprises a canister 10 serving as a protective housing and mounting means for an expansible bellows 11 and for an electrical induction coil 12. Although a housing of canister formation is especially convenient and economical, housings of various forms may be employed where circumstances warrant.

The bellows 11 is preferably of a type having inherent resiliency, so as to contract and return to its initial position of its own accord when fluid pressure applied internally thereof is relieved. A commercial bellows, designated "Ni-Span-C" by its manufacturer, Bristol Corporation, Waterbury, Conn., made of chrome-nickel stainless steel alloy and having a longitudinal deflection of one-fifth of an inch under internal fluid pressure of four pounds per square inch, has been found to serve the purpose very well.

One end of such bellows 11 is affixed at or near one end of the canister 10 so that the body of the bellows extends longitudinally of the interior of the canister, preferably coaxially therewith but in any event free and clear of contact with any other part of the transducer. As illustrated, a conduit 13 for the supply of a fluid under pressure serves to mount the bellows in the prescribed manner in end wall 10a of the canister. In some instances it will be desirable to extend the length of the canister so that, in effect, end wall 10a becomes a fixed bulkhead within the canister, see FIGS. 5–7. This is immaterial to the functioning of the transducer as here described.

The opposite end of the bellows 10 carries a core piece 14 for the hollow core 15 of the induction coil 12. In the illustrated instance this is entirely of a magnetic material, such as ferrite, and is secured in a non-magnetic tubular extension 16 of the bellows.

As so mounted, core piece 14 extends beyond the corresponding end of bellows 11 and partially projects into hollow core 15 of the induction coil, so that, when the bellows expands by reason of internal fluid pressure, such core piece projects to an increasing extent into the coil and changes the inductive value of any electrical output circuit into which the coil is connected. The diameter of core piece 14 is less than the diameter of its receiving core 15, and such core piece is preferably supported by bellows 11 so that it moves freely within coil 15 without frictionally contacting the coil. Moreover, it is also preferred that the bellows and the core piece which it carries be supported solely by the aforedescribed mounting in the canister.

Induction coil 12 is affixed as by means of screws 17 to a movable bulkhead 18, which is mounted near the opposite end wall 10b of the canister on symmetrically arranged guide pins 19. In the form shown, these guide pins 19 are secured in and project internally of the canister from end wall 10b thereof. They are received by correspondingly located receiving holes in the bulkhead and serve to slidably mount such bulkhead.

Adjustment of the position of the induction coil 12 relative to its core piece 14 so as to establish a proper initial relationship therebetween for any given use of the transducer is accomplished by an adjustment screw 20, whose flanged end 20a is rotatably anchored in a countersunk receiving recess 21 by means of the coil 12. The slotted head end 20b of such screw 20 is threaded through a tapped receiving opening in end wall 10b of the canister and is available externally of the canister for turning by use of an ordinary screw driver. A protective cap 22 is advantageously applied over the otherwise exposed head of this screw 20.

Electrical leads 23 for induction coil 12 extend through a passage 24, provided in bulkhead 18, from a plug-receiving, electrical receptacle 25 mounted in end wall 10b of the canister. In this manner, the transducer can be connected into any suitable electrical output circuit.

Constructed as it is, the fluid pressure transducer of the invention is particularly adapted for installation with its longitudinal axis horizontal and the bellows and core piece extending as a cantilever. As so positioned, the adjustment end of the cantilever faces sidewardly and can be made easily accessible in any installation, see for example FIG. 4.

To equalize pressure inside the canister with barometric pressure, a vent fitting 26 is threaded through end wall 10b of the canister. An elongate flexible tube 27, see FIG. 4, may extend from such vent fitting to any suitable venting location.

The embodiment of the invention shown by FIG. 3 has a different arrangement of core piece relative to induction coil. Instead of fluid pressure changes causing the core piece to be increasingly inserted into the coil, they cause the core piece to be increasingly ejected from the coil.

Here, as in the first embodiment, a bellows 30 is mounted in a canister 31 with its pressure-fluid-intake-end secured in a canister end wall 31a, and an induction coil 32 is secured to a movable bulkhead 33, adjustably mounted on the opposite canister end wall 31b. The core piece, however, has a non-magnetic portion in the form of a non-ferrous rod 34a secured to the bellows and extending partially through the hollow core 35 of coil 32, and a magnetic portion 34b extending from the termination of rod 34a at least to the far end 32a of the coil and preferably beyond as shown.

To accommodate movement of the core piece due to fluid under pressure internally of the bellows, bulkhead 33 is spaced a suitable ditsance from end wall 31b of the canister by a pair of adjusting screws 36.

There is provided in this embodiment, as there may be also in the first embodiment, a variable inductance 37 having a control screw 37a extending toward canister end wall 31b for adjustment from the exterior of the canister, conveniently through the opening left when vent fitting 38 is unscrewed. This inductance is electrically connected in series circuit with induction coil 32 and enables optimization of the scale factor of any measurement system with which the tranducer is used.

Either of the foregoing embodiments may be incorporated in a novel precipitation measurement gauge constituting an improvement on the precipitation measurement gauge disclosed and claimed in the aforereferred-to Chadwick application Ser. No. 691,263. An embodiment of the improved gauge is illustrated in FIG. 4.

As illustrated, a length of rigid tubing 40 of suitable diameter for any given instance of use is secured to a base plate 41 by means of gusset plates 42. Such tube 40 will have a length exceeding any anticipated depth of snow in the area of installation of the precipitation gauge, so that its open upper end 43 will always be uncovered and free to receive precipitation from the atmosphere.

By reason of a bottom plate 44 affixed in liquid-tight relationship within the tube 40 at a suitable distance from its lower end, the upper portion 40a of such tube constitutes a vessel for receiving and containin a charge of antifreeze solution 45 and for receiving and containing atmospheric precipitation in the form or rain or snow as and when it falls. The lower portion 40b of the tube constitutes a utility chamber wherein is mounted a fluid pressure transducer 47. A door 48 in such lower portion of the tube provides convenient access to the adjustment end 47a of the transducer.

Because of the possibility, in the event of especially heavy precipitation and excessively cold weather, of freezing of the precipitation-diluent anti-freeze solution, with consequent damaging of the bellows of the transducer, and to enable manufacture of the tranducer as a completely prepared unit for installation on any job without the necessity of charging the bellows with an antifreeze liquid at the job site, the further embodiment of FIGS. 5 and 6 has been developed.

In the form illustrated, this embodiment includes a bellow-50 mounted in cantilever fashion in an intermediate bulkhead 51 of canister 52. A magnetic core piece 53 is carried by the opposite end of bellows 50 and projects as a cantilever into the hollow core of inductance coil 54. As in the previous embodiments, coil 54 is secured to a movable bulkhead 55 by means of an adjusting screw 56 whose head end exteriorly of the canister is protected by a cap 57.

A hermetically sealed pressure-receiving chamber 58 is provided at the opposite side of bulkhead 51 by means of a fully compliant diaphragm 49 of Buna-N synthetic rubber or the like secured over and in sealed relationship with a circumferential flange 41a of bulkhead 51 as by means of a suitable adhesive. At the factory prior to shipment of the transducer an antifreeze liquid, such as hydraulic brake fluid, is introduced into bellows 50 and chamber 58 in quantity just sufficient to completely fill such bellows and chamber and to displace all air therefrom. This is conveniently accomplished by drilling a small hole through a wall of the chamber and afterward sealing it off with a hard-setting adhesive material.

It should be noted that chamber 58 is in open communication with the interior of the bellows through the open end of mounting member 50a thereof.

For applying the fluid pressure to be measured to the liquid within the bellows, canister 52 is extended beyond diaphragm 59 by an end section 52c so that a pressure-imparting chamber 61 is formed by such end section 52c, and canister end wall 52a. Fluid under pressure is admitted to chamber 61 by means of a fitting 62 threaded through canister end wall 52a, such fluid under pressure being supplied to the fitting from the source of same by a tube 63.

As in the previous embodiments, a variable inductance 64 is preferably provided in movable bulkhead 55 directly opposite a vent fitting 65 threaded through canister end wall 52b.

When mounted as the pressure transducer unit 47 in the precipitation measurement gauge of FIG. 4, vent tube 27 is connected to vent fitting 65. Hydrostatic pressure of the charge 45 of antifreeze solution and any precipitation caught by the vessel 40a is communicated to diaphragm 59 by means of an upstanding rigid pipe 66 that extends through bottom 44 of the vessel and is connected to fitting 62 by means of a flexible tube 63. The upper end 66a of pipe 66 is turned downwardly to avoid stoppage due to a foreign object, such as a dead bird, falling into the receiving vessel.

The upper end 27a of vent tube 27 is preferably turned downwardly and hooked over the upper end of vessel 30a so its opening will not become clogged.

In FIG. 7 is shown an adaptation of the fluid pressure transducer of FIGS. 5 and 6 for measuring the level of flowing streams or other bodies of water, such as rivers, lakes, reservoirs, etc. There, a perforate extension 70 of the canister housing replaces the extension 52c and is closed by a disc 71 of heavy material, such as lead, and by a cover plate or canister end 72. The disc 71 is held in place by a series of screws 73, and by its weight, helps to anchor the transducer at the bottom of the body of water.

Hydrostatic pressure of the overlying body of water is communicated through the perforations of canister extension 70 to diaphragm 74.

We claim:

1. A fluid pressure transducer, comprising a protective housing in the form of a canister having opposite end walls; a bellows having one of its ends secured at or near one end wall of the housing and its body extending longitudinally along the housing; a magnetic core piece carried by and projecting beyond the opposite end of the bellows; a movable bulkhead within the housing adjacent to the other end wall of the housing; an adjusting screw threaded through the said other end wall of the housing and mounting said bulkhead for movement toward and away from the bellows, said screw being operable from the exterior of the housing; an electrical induction coil mounted on the bulkhead opposite the bellows, with its hollow core in alignment with said core piece, said core piece projecting into said hollow core for movement therealong; means for exerting fluid pressure within said bellows; and means for venting said housing to atmosphere exteriorly of said bellows.

2. A fluid pressure transducer in accordance with claim 1, wherein the core piece projects partially into the hollow core of the induction coil from its mounting on the bellows.

3. A fluid pressure transducer in accordance with claim 1, wherein the core piece comprises an elongate, nonmagnetic portion secured to the bellows and extending partially through the hollow core of the induction coil, the magnetic portion of said core piece extending from the termination of said non-magnetic portion thereof at least to the far end of said coil.

4. A fluid pressure transducer in accordance with claim 1, wherein there are additionally provided supporting guide members between the bulkhead and adjacent end of the housing.

5. A fluid pressure transducer in accordance with claim 4, wherein the supporting guide members are pins secured to and projecting inwardly from the adjacent end of the housing, the bulkhead being slidably mounted on said pins.

6. A fluid pressure transducer in accordance with claim 1, wherein variable inductance means are provided in series circuit with the inductance code for enabling the scale factor of the transducer to be optimized under any given conditions of use in a measurement system.

7. A fluid pressure transducer in accordance with claim 1, wherein the core piece extends beyond the bellows as a cantilever relative thereto, being supported solely by the bellows for movement free of the coil.

8. A fluid pressure transducer in accordance with claim 7, wherein the bellows is of self-contractile type.

9. A fluid pressure transducer in accordance with claim 1, wherein the means for exerting fluid pressure within the bellows comprises a body of liquid filling said bellows; a fully compliant diaphragm confining said body of liquid within the bellows; and means for applying a fluid under pressure against said diaphragm.

10. A fluid pressure transducer in accordance with claim 9, wherein the diaphragm and adjoining portions of the housing form a pressure-receiving chamber in communication with the interior of the bellows, the body of liquid also filling said chamber.

11. A fluid pressure transducer in accordance with claim 10, wherein the diaphragm and other portions of the housing form a pressure-imparting chamber constituting means for applying a fluid under pressure against the diaphragm; and wherein said means also includes means for introducing a fluid under pressure into said pressure-imparting chamber.

12. A fluid pressure transducer in accordance with claim 11, wherein the body of liquid is an antifreeze.

13. A fluid pressure transducer in accordance with claim 11, wherein the pressure-imparting chamber is hermetically sealed except for an inlet for a fluid under pressure, which constitutes fluid pressure introducing means; and wherein said means also includes means for attaching a fluid pressure line to said inlet.

14. A fluid pressure transducer in accordance with claim 10, wherein walls of the pressure-imparting chamber other than the diaphragm are perforate for the inflow of a pressure fluid when the transducer is submerged in said pressure fluid.

15. A precipitation measurement gauge, comprising a fluid pressure transducer comprising a protective housing; a bellows having one of its ends secured at or near one end of the housing and its body extending longitudinally along the housing; a magnetic core piece carried by and projecting beyond the opposite end of the bellows; a movable bulkhead at the opposite end of the housing; an adjusting screw threaded through the said opposite end of the housing and mounting said bulkhead for movement toward and away from the bellows, said screw being operable from the exterior of the housing; an electrical induction coil mounted on the bulkhead opposite the bellows, with its hollow core in alignment with said core piece, said core piece projecting into said hollow core for movement therealong; a body of liquid filling said bellows; a fully compliant diaphragm confining said body of liquid within the bellows and, together with adjoining portions of the housing, forming a pressure-receiving chamber in communication with the interior of the bellows, said body of liquid also filling said chamber; said diaphragm and other portions of the housing forming a pressure-imparting chamber constituting means for applying fluid under pressure against the diaphragm, said pressure-imparting chamber being hermetically sealed except for an inlet for a fluid under pressure; means for attaching a fluid pressure line to said inlet for introducing a fluid under pressure into said pressure-imparting chamber; an upstanding, elongate, tubular structure having an open top and a closed bottom intermediate its height to form a precipitation-receiving vessel in the upper part of said structure, the lower part of said structure forming a utility compartment in which said transducer is mounted; a pressure line having an upper end opening into said vessel adjacent to its bottom and its other end connected to the attaching means of said transducer; and a vent line having a lower end in open communication with the portion of the interior of the housing in which the bellows is located and an upper end open to the atmosphere adjacent to said open top of the vessel.

16. A precipitation measurement gauge in accordance with claim 15, wherein the body of liquid within the bellows and pressure-receiving chamber is an antifreeze.

17. A precipitation measurement gauge in accordance with claim 15, wherein there is an access door to the lower part of the tubular structure leading into the utility compartment; and wherein the transducer is mounted with its longitudinal axis substantially horizontal so that the adjusting screw end of the housing is facing said door.

References Cited
UNITED STATES PATENTS

| | | | |
|---|---|---|---|
| 1,841,848 | 1/1932 | Quinby | 73—395 |
| 2,564,221 | 8/1951 | Hornfeck | 336—30 |
| 2,841,984 | 7/1958 | Green | 73—395 |
| 2,922,971 | 1/1960 | Jeglum | 336—30 |
| 3,108,213 | 10/1963 | Golder et al. | 336—136X |

DONALD O. WOODIEL, Primary Examiner

U.S. Cl. X.R.

73—398